(12) United States Patent
Lection et al.

(10) Patent No.: US 7,236,577 B2
(45) Date of Patent: Jun. 26, 2007

(54) CALL SCREENING SYSTEM AND METHOD

(75) Inventors: David B. Lection, Raleigh, NC (US);
Eric L Masselle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 10/294,707

(22) Filed: Nov. 14, 2002

(65) Prior Publication Data

US 2004/0096046 A1    May 20, 2004

(51) Int. Cl.
  *H04M 1/56* (2006.01)
  *H04M 15/06* (2006.01)
  *H04M 1/64* (2006.01)
  *H04M 3/42* (2006.01)

(52) U.S. Cl. ........................ 379/142.05; 379/142.06; 379/207.15; 379/211.01; 379/70

(58) Field of Classification Search .. 379/88.19–88.21, 379/93.23, 142.01–142.18, 354, 245, 67.1, 379/72, 76, 201.01, 201.11, 207.13, 207.15, 379/207.16, 210.03, 211.01; 455/405–411
See application file for complete search history.

(56) References Cited

U.S. PATENT DOCUMENTS

| | | | | |
|---|---|---|---|---|
| 4,881,259 A | * | 11/1989 | Scordato | 455/412.2 |
| 5,533,102 A | | 7/1996 | Robinson et al. | 449/569 |
| 5,757,891 A | | 5/1998 | Wang | 379/93.24 |
| 5,850,435 A | * | 12/1998 | Devillier | 379/374.02 |
| 5,905,774 A | * | 5/1999 | Tatchell et al. | 379/88.04 |
| 6,038,443 A | | 3/2000 | Luneau | 455/415 |
| 6,041,103 A | * | 3/2000 | La Porta et al. | 379/67.1 |
| 6,101,249 A | | 8/2000 | Weber | 379/188 |
| 6,160,876 A | * | 12/2000 | Moss et al. | 379/142.02 |
| 6,335,962 B1 | * | 1/2002 | Ali et al. | 379/88.11 |
| 6,337,898 B1 | * | 1/2002 | Gordon | 379/67.1 |
| 2001/0028703 A1 | * | 10/2001 | Katseff et al. | 379/88.18 |
| 2002/0097850 A1 | * | 7/2002 | Schemers et al. | 379/90.01 |

OTHER PUBLICATIONS

*Phone Scoop: Call Screening*, <http://www.phonescoop.com/glossary/term.php?fid=49>, (Oct. 25, 2002).

(Continued)

*Primary Examiner*—Quoc Tran
(74) *Attorney, Agent, or Firm*—Jeanine Ray-Yarletts, Esq.; Steven M. Greenberg, Esq.; Carey Rodriguez Greenberg & Paul LLP

(57) ABSTRACT

A call screening system and method. The method can include receiving an inbound telephone call destined for a called party. Associated caller identification data can be identified from the inbound telephone call. The associated caller identification data can be compared to a filter list of caller identification data. Finally, based upon the comparison, call management rules can be applied to the inbound call to manage the inbound call by either deferring the inbound call to voice mail, or automatically answering the inbound call without requiring pro-active intervention by the called party. Significantly, each of the receiving, identifying, comparing and applying steps is performed in a telephone tranceiving device. Alternatively, the receiving, identifying, comparing and applying steps can be performed centrally in a call processing switch.

12 Claims, 3 Drawing Sheets

OTHER PUBLICATIONS

*TVS Live Call Screening*, <http://panasonichelp.com/TVS%20Live%20Call%20Screen.htm>, (Oct. 25, 2002).
*Southwestern Bell All Digital Answering Machine, Call Screening, LED Message, BK*, <http://www.newsearching.com/answering_machine/Southwestern_Bell_All_Digital_Ans...>, (Oct. 25, 2002).
*Telemarketer Call Screening, Innovative Systems, LLC*, <http://www.innovsys.com/nonregistered/services/ASP/TelemarketerCallScreening.asp>, (Oct. 25, 2002).
*Residential Products and Services, SBC Ameritech*, <http://www.ameritech.com/Products_Services/Residential?ProdInfo_1/1,,192-13-3-0,00...>, (Oct. 25, 2002).
*Telephone Answering Service Solutions, MAP Mobile Communications, Inc.*, <http://www.mapmobile.com/services/screen.html>, (Oct. 25, 2002).
*At Home Calling Features Call Screening, CC Communications*, <http://www.cccomm.net/AtHome/Calling_Features/callscreen.htm>, (Oct. 25, 2002).

* cited by examiner

CALL SCREENING SYSTEM AND METHOD

BACKGROUND OF THE INVENTION

1. Statement of the Technical Field

The present invention relates to call screening and more particularly to the hands free management of a telephone call.

2. Description of the Related Art

Call screening relates to the deferral of a telephone call until such time as the called party can decide whether or not to answer the telephone call. Typically, called parties manual undertake call screening simply by monitoring an answering machines handling of an incoming telephone call to determine the identity of the calling party. To that end, the called party relies upon the calling party leaving a voice message so as to provide identifying information to the called party. Manual call screening can be ineffective, however, in view of newer voice mail technologies which do not provide for a separate telephone answering device through which a called party can monitor an incoming telephone call.

Voice mail technologies have been applied not only to ordinary telephone networks, but also to pervasive telephony including cellular telephones. Notwithstanding, call screening remains an important aspect of pervasive telephony, in particular where the cost of a telephone call can far exceed that of a telephone call through a conventional telephone network. Consequently, call screening can be performed manually in such circumstances through the use of caller ID functionality known to those skilled in the art. Where a called party manually screens a telephone call through caller ID, the called party simply views the caller ID information through the telephone itself, or through a specially configured caller ID device. Based upon the caller's identify displayed in the telephone, the called party can choose whether or not to answer the telephone call.

To effectively screen a telephone call using caller ID technology, a called party must actively handle and view the display of either the telephone handset or external caller ID device so as to visually inspect the identification of the caller. In this regard, the visual inspection of a telephone handset or external caller ID device can prove difficult in circumstances where the called party is pre-occupied, such as when the called party is operating a vehicle, or when the hands of the called party are holding other objects. To address these concerns, some telephone devices include an audible indication of a callers ID. Nevertheless, the mere audible indication of a caller's ID does not relieve the called party from physically handling the telephone handset when choosing to answer a telephone call.

Several centralized services have become available in which telephone calls destined for a called party are intercepted and screened prior to the connection of the telephone call to the called party. Specifically, switch applications can compare the identity of the calling party to a list of pre-specified telephone numbers to determine which calls are to be routed to voice mail, and which calls are to ring through to the called party. This switch-centric routing can be helpful in particular where the pre-specified telephone numbers include a generic determination that any call originating from an unidentifiable caller should be treated as a call to be routed to voice mail. As a result, switch-centric call screening can be an effective tool against unwanted telemarketing activities.

Still, switch-centric call screening does not permit real-time caller intervention in the screening process. Specifically, all screening determinations are based on a pre-specified list of calling party identities. In consequence, the called party cannot in real-time select which calls to answer and which calls to route to voice mail. Moreover, in the switch-centric call screening paradigm, calls which ring through to the called party do not relieve the called party from handling the telephone handset. Again, in many circumstances it can be inconvenient if not outright dangerous to handle an incoming telephone call—especially where the called party concurrently operates a vehicle.

SUMMARY OF THE INVENTION

The present invention is a call screening system and method which addresses the deficiencies of the prior art and provides a novel and non-obvious method for performing call screening according to management rules associated with caller identification data in a filter list. By configuring a filter list of caller identification data with which caller identification of an inbound telephone call can be matched, hands-free operational functionality of a telephone transceiver can be facilitated. For instance, automatic answering of selected inbound telephone calls can be provided, as can automatic and prompted deferral of selected inbound telephone calls. Finally, hands-free, automatic play back of previously stored voice mail can be provided when the telephone transceiving device has been configured to receive telephone calls.

In one aspect of the present invention, a call screening system can be provided. The call screening system can include a filter list of caller identification data and a mapping of the caller identification data in the filter list to corresponding call management rules. An automatic call answering processor can be configured to automatically establish a connection with a calling party based upon an attempt by the calling party to establish a call connection with a called party. Finally, a call screening processor can be coupled to the filter list, the mapping and the automatic call answering processor.

The call screening processor can match caller identification data within inbound telephone calls to individual ones of the caller identification data in the filter list. The call screening processor further can apply the corresponding call management rules to the inbound telephone calls based upon the call management rules which are mapped to the caller identification data in the filter list. Finally, the call screening processor yet further can selectively activate the automatic call answering processor to automatically establish individual ones of the inbound telephone calls where the call management rules specify that an automatic answering of an inbound telephone call should occur.

Notably, each of the filter list, the mapping and the automatic call answering processor can be contained within a telephone transceiving device. Exemplary telephone transceiving devices can include wireline telephones and telephone handsets, wireless telephones, cellular telephones and pervasive devices. The management rules can include several rules intended to facilitate the hands-free management of inbound telephone calls. At least one rule can include and automatic answering of selected inbound telephone calls; the automatic deferring of selected inbound telephone calls to voice mail; the automatic audio prompting whether to defer or accept selected inbound telephone calls; and, the automatic monitoring of a telephone line to identify when an inbound call be processed over the telephone line, and playing back of previously recorded voice mail over the telephone line when the monitoring determines that the telephone line can process an inbound call.

A call screening method can include receiving an inbound telephone call destined for a called party. Associated caller identification data can be identified from the inbound telephone call. The associated caller identification data can be compared to a filter list of caller identification data. Finally, based upon the comparison, call management rules can be applied to the inbound call to manage the inbound call by either deferring the inbound call to voice mail, or automatically answering the inbound call without requiring pro-active intervention by the called party. Significantly, each of the receiving, identifying, comparing and applying steps is performed in a telephone tranceiving device.

Importantly, where it is determined not to defer the inbound call to voice mail, the applying step can include determining from the filter list whether to automatically answer the inbound call, or whether to permit the called party to determine whether to answer the inbound call, or whether to allow the inbound call to route to the voice mail. Also, the applying step further can include audibly prompting the called party to determine whether to accept or to defer the inbound call. In consequence, where the called party indicates that the inbound call should be deferred, the inbound call can be routed to voice mail. Finally, the called party can be monitored to determine when the called party can accept an inbound phone call. When it is determined in the monitoring step that the called party can accept an inbound phone call, the deferred voice mail can be automatically playing back to the called party without requiring pro-active intervention by the called party to initiate the playing back step.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a call screening system and method. In accordance with the inventive arrangements, the call screening system and method of the present invention can base call screening logic upon a set of filtering rules for selected callers. More particularly, in the call screening system of the present invention, incoming calls can be configured for hands-free management based upon the identify of the calling party. Examples of hands-free management of an incoming telephone call can include, for instance, automatic call answering, automatic deferral of a telephone call to voice mail, selective deferral of a telephone call to voice mail, and automatic notification of a called party when a message has been delivered to voice mail.

Figure 1:
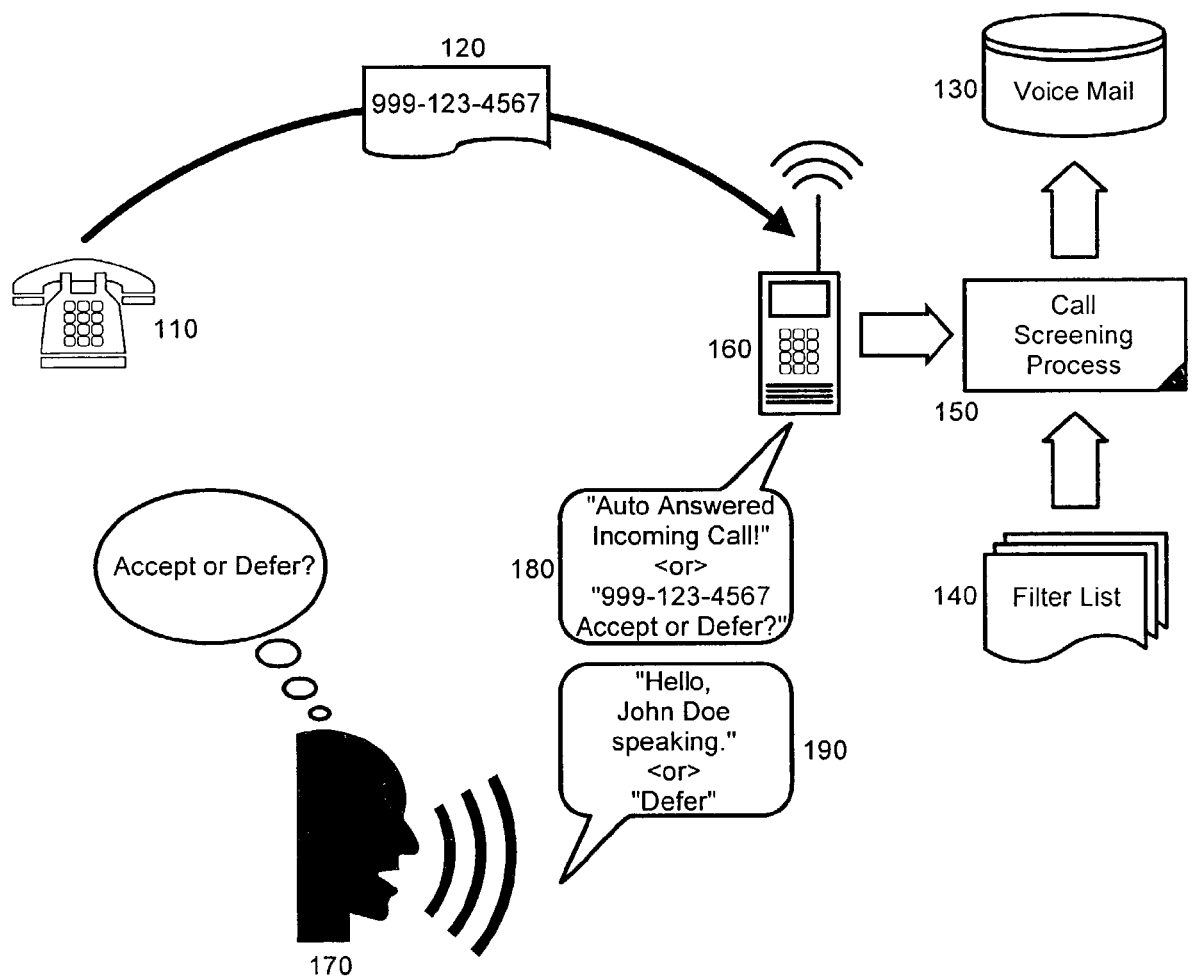
FIG. 1 is a pictorial illustration of a call screening system of the present invention.

FIG. 1 is a pictorial illustration of a call screening system of the present invention. In accordance with the present invention, a calling party 110 can initiate a telephone call to the called party 170 which can be received in the handset 160 of the called party 170. Though the handset 160 of FIG. 1 would appear as one of either a portable, radio-frequency handset, or a cellular telephone, the invention is not so limited and any telephone receiving device can suffice, including, for example, conventional telephones, computer controlled digital phone devices, pervasive computing devices and the like. In any case, as it will be recognized by the skilled artisan, associated with the telephone call of the calling party, caller identification data 120 can be included as part of the call which can interpreted by the handset 160.

Upon receipt of the call, the handset 160 can identify the caller identification data 120 can subject the telephone call to a call screening process 150 prior to routing the telephone call to one of the called party 170 and voice mail 130. Importantly, the call screening process can programmatically compare the caller identification data 120 to a filter list 140 in order to determine the manner in which the telephone call ought to be handled. In this regard, the call screening process 150 can determine whether the caller identification data 120 matches a listing within the filter list 140, which listing corresponds to a particular call management rule. Examples of call management rules can include, for instance, automatically answering the telephone call, routing the telephone call directly to voice mail 130 in a call deferral process, or prompting the called party 190 for instructions on whether to defer or accept the telephone call.

As an example, where the caller identification data 120 is the phone number of the calling party 110 matches the phone number in the filter list 140, the corresponding rule as processed within the call screening process 150 might require that the telephone call is automatically answered by the called party 170. To that end, an announcement 180 can indicate to the called party 170 that the call has been automatically answered and that the called party 170 should begin conversing with the calling party 110 in a hands-free manner. Alternatively, the corresponding rule as processed within the call screening process 150 might require that the called party 170 is prompted as to whether the telephone call should be accepted, or deferred to voice mail 130. Based upon the response 190 of the called party 170, the telephone call can be deferred to voice mail 130.

It will be apparent to one skilled in the art, that the call screening process of the present invention can provide for the hands-free management of a telephone call without requiring the called party 170 to view the display of the handset 160, or to use the hands of the called party 170. Rather, in a preferred albeit non-exclusive aspect of the invention, the called party 170 can manage the call in a completely hands-free manner. Specifically, minimally the called party 170 need only begin speaking when a call has been auto-answered. Conversely, the called party 170 might manage the call through brief verbal instructions such as "defer" and "hang up".

Figure 2:
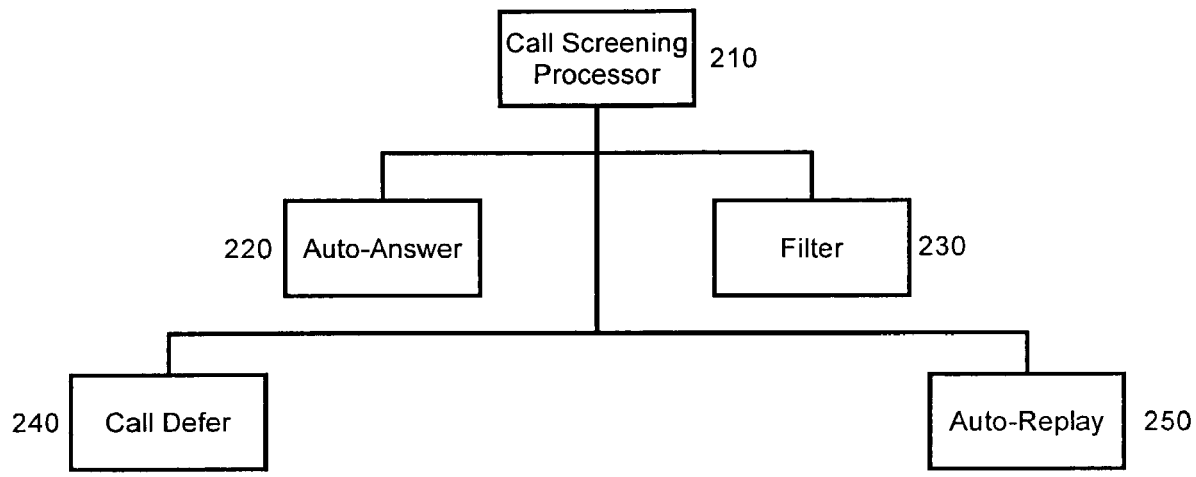
FIG. 2 is a block diagram illustrating an exemplary configuration of the call screening system of FIG. 1.

FIG. 2 is a block diagram illustrating an exemplary configuration of the call screening system of FIG. 1. The call screening system can include a call screening processor 210. The call screening processor 210 can apply call management rules to inbound telephone calls based upon a filter list of pre-specified caller identification elements, including any portion of a calling party telephone number, any portion of a calling party name, a calling party location, or a time of the telephone call. The management rules can be governed by any number of complementary call management processes, including an auto-answer process 220, a call filter process 230, a call deferral process 240, and an automatic voice message replay process 250.

The auto-answer process 220 can automatically establish a telephone call between the calling party and the called party without requiring the called party to undertake any affirmative action. Rather, when a calling party having caller identification data which satisfies a rule in the filter list attempts a phone call, the call screening processor 210 can automatically answer the phone call while alerting the called party that the call has been automatically answered. The filter process 230, by comparison, can automatically route an inbound telephone call to one of the called party and voice mail, depending upon whether the caller identification data associated with the inbound telephone call matches an entry in the filter list.

The call deferral process 240 can provide an extension to the auto-answer process 220. Specifically, where the caller identification data of an inbound call matches an entry in the filter list, the called party can be prompted either to accept the phone call, or to defer the phone call to voice mail. Based upon the response of the caller, whether the response is by voice or by keypad, the call can be routed to voice mail, or connected to the called party. Finally, the auto-replay process 250 can automatically replay a stored message in voice mail when the auto-replay process 250 detects that the handset of the called party is free to accept calls. Alternatively, the auto-replay process 250 can automatically prompt the called party that a message has been stored in voice mail and the auto-replay process 250 can permit the called party to play back the stored message. In either case, where a call might automatically be routed to voice mail while the called party is engaged in a telephone call using the handset, when the called party disengages from the prior telephone call, the called party automatically can be notified of a stored message without requiring an affirmative, pro-active request for the same.

Importantly, the call screening processor 210 of FIG. 2 can be implemented within the handset of the called party. Alternatively, the call screening processor 210 can be implemented centrally. In the case where the call screening processor 210 has been implemented centrally, the functionality of the call screening processor 210 can be provided to different handsets used by the same called party subscriber. However, where the call screening processor 210 has been implemented centrally, the called party will be dependent upon a central source of functionality. In contrast, where the call screening processor 210 has been implemented within the handset, the called party will not be dependent upon a central source of functionality though the functionality will be limited to the handset.

Figure 3:
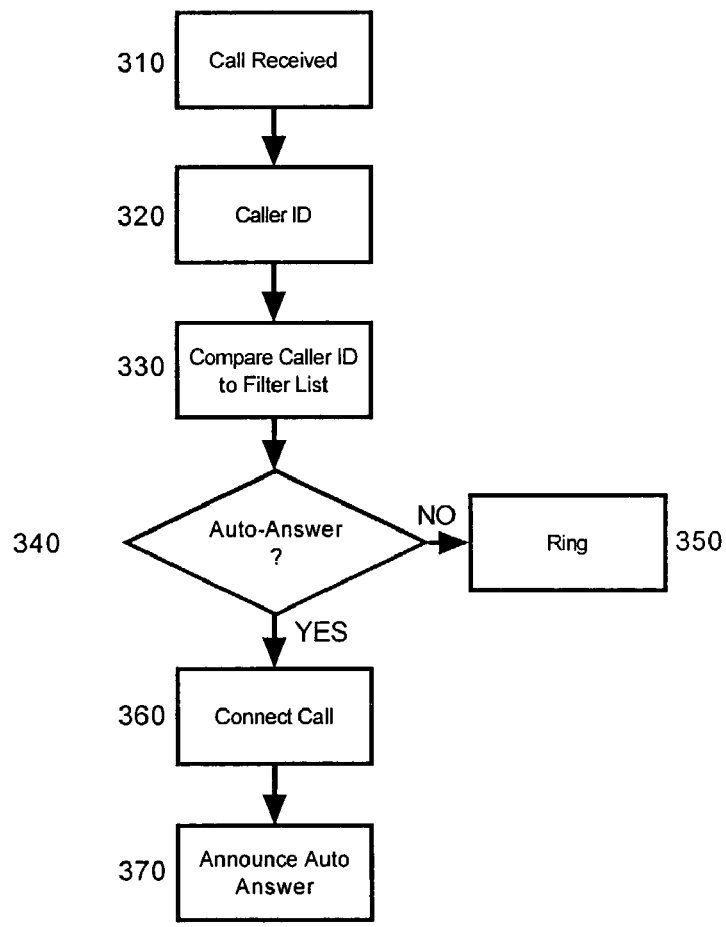
FIG. 3 is a flow chart illustrating a process for automatically answering a call according to filtering rules of the call screening system of FIG. 2.
Figure 4:
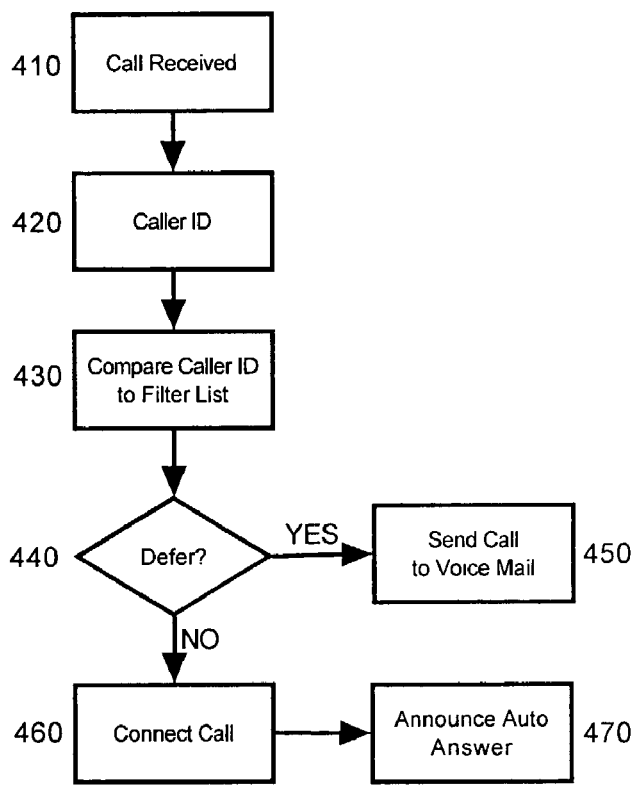
FIG. 4 is a flow chart illustrating a process of programmatically deferring a call to voice mail according to filtering rules of the call screening system of FIG. 2; and, FIG. 5 is a flow chart illustrating a process for automatically playing back a deferred message in the call screening system of FIG. 2.
Figure 5:
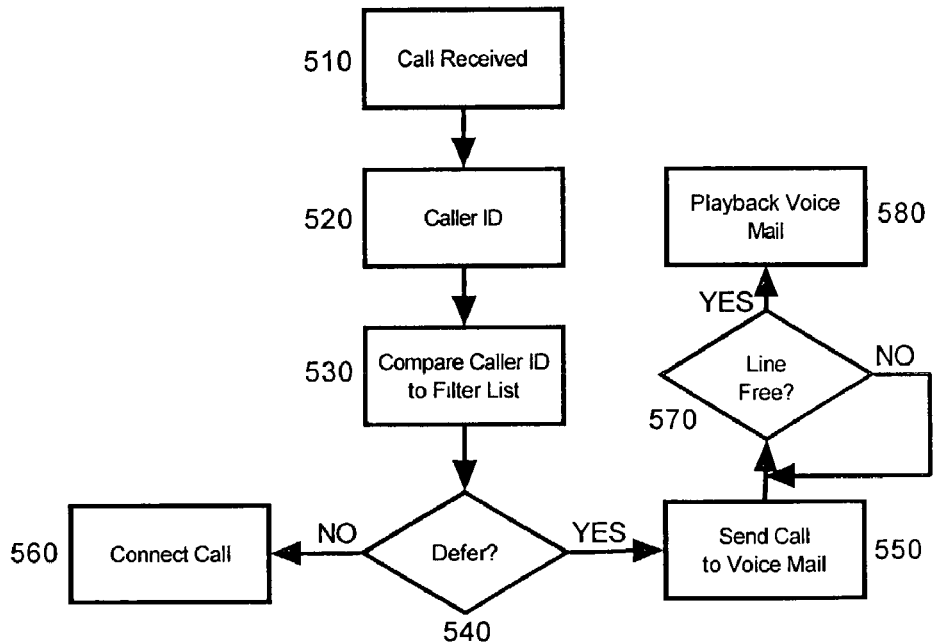

FIGS. 3 through 5 particularly illustrate three call management processes configured for operation with the call screening system of the present invention, though the skilled artisan will recognize that the three illustrated call management processes do not represent the exclusive call management processes of the present invention. Rather, any number of filter list based management processes can be configured for operation with the call screening process of the present invention so long as such call management processes are intended to facilitate hands-free operation of the handset on the part of the called party.

Turning now specifically to FIG. 3, a flow chart illustrates a process for automatically answering a call according to filtering rules of the call screening system of FIG. 2. Beginning in block 310, a telephone call can be received in the handset. In block 320, the caller identification data associated with the telephone call can be extracted and in block 330, the caller identification data can be compared to entries in a filter list of caller identification data. In decision block 340, if the caller identification data of the telephone call does not match an entry in the filter list, in block 350 the call can be passed through on a ring-tone basis as would be the ordinary circumstance.

In decision block 340, however, if the caller identification data of the telephone call does match an entry in the filter list, in block 360 the telephone call can be connected automatically and in block 370 the called party can be notified that the call has been automatically answered on behalf of the called party. In this way, no physical intervention will be required by the called party in order to answer the telephone call. That is to say, the call screening process can be configured to facilitate the complete hands-free operation of selected phone calls which had been previously specified in the filter list. Accordingly, the called party can remain free to undertake other tasks, for instance the operation of a motor vehicle of the use of a personal computer using both hands, to name a few examples.

FIG. 4 is a flow chart illustrating a process of programmatically deferring a call to voice mail according to filtering rules of the call screening system of FIG. 2. Beginning in block 410, a telephone call can be received in the handset. In block 420, the caller identification data associated with the telephone call can be extracted and in block 430, the caller identification data can be compared to entries in a filter list of caller identification data. In decision block 440, if the caller identification data of the telephone call does not match an entry in the filter list, in block 450 the call can be routed directly to voice mail without notifying the called party that the calling party has attempted to call the called party.

In decision block 440, however, if the caller identification data of the telephone call does match an entry in the filter list, in block 460 the telephone call can be connected automatically and in block 470 the called party can be notified that the call has been automatically answered on behalf of the called party. In this way, no physical intervention will be required by the called party in order to answer the telephone call. Importantly, in an alternate aspect of the present invention, in decision block 440 the call need not be routed directly to voice mail without first notifying the called party of the call attempt. Rather, in the alternate aspect of the process, the call screening process can prompt the called party whether the called party will accept or defer the call. Based upon the response of the called party, be it by voice, keypad or other such physical indication, the call can either be automatically answered or deferred.

FIG. 5 is a flow chart illustrating a process for automatically playing back a deferred message in the call screening system of FIG. 2. Specifically, in block 510 a telephone call can be received in the handset. In block 520, the caller identification data associated with the telephone call can be extracted and in block 530, the caller identification data can be compared to entries in a filter list of caller identification data. In decision block 540, to the extent that the telephone call can be routed to the called party, in block 560 the call can be routed to the called party so long as the rules filter list permit the same.

By comparison, in decision block 540, to the extent that the telephone call cannot be routed to the called party, either in consequence of the rules of the filter list, or such as when the called party has already engaged in the use of the handset, or when the handset cannot process incoming calls, in block 550 the call can be routed to voice mail. Significantly, in block 570 it can be determined whether the called party has enabled the handset to receive further calls, either through the re-activation of the handset, or the termination of a prior call. If not, the call screening process can periodically or continually test for the availability of the handset. Once the handset becomes available, in block 580 the voice mail previously stored in block 550 can be automatically played back to the called party so as not to require any physical handling of the handset.

Notably, it will be apparent to one skilled in the art that the foregoing call management processes of the call screening system of the present invention can facilitate the safe and effective hands-free operation of a telephone handset in a highly-personalized manner so that only pre-specified telephone calls which can be identified based upon a filter list are handled in a hands-free manner, while other calls are handled either conventionally, or in a different hands-free manner. Still, it will be important to recognize that the call management processes described herein are not the exclusive processes associated with the call screening system of the present invention and other variations of the same can be configured as it will be understood by the skilled artisan.

The present invention can be realized in hardware, software or firmware, in a centralized fashion in one computer system, or in a distributed fashion where different elements are spread across several interconnected computer systems. Any kind of computer system, or other apparatus adapted for carrying out the methods described herein, is suited to perform the functions described herein. A typical centralized implementation could include a general purpose computer system with a computer program that, when being loaded and executed, controls the computer system such that it carries out the methods described herein.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A call screening system comprising:
   a filter list of caller identification data;
   a mapping of said caller identification data in said filter list to corresponding call management rules;
   an automatic call answering processor configured to automatically establish a connection with a calling party based upon an attempt by said calling party to establish a call connection with a called party; and,
   a call screening processor coupled to said filter list, said mapping and said automatic call answering processor;
   said call screening processor matching caller identification data within inbound telephone calls to individual ones of said caller identification data in said filter list, said call screening processor further applying said corresponding call management rules to said inbound telephone calls based upon said call management rules which are mapped to said caller identification data in said filter list;
   said call screening processor yet further selectively activating said automatic call answering processor to automatically establish individual ones of said inbound telephone calls where said call management rules specify that an automatic answering of an inbound telephone call by the party should occur, wherein
   said management rules includes automatic monitoring of a telephone line to identify when an inbound call be processed over said telephone line, and playing back of previously recorded voice mail over said telephone line when said monitoring determines that said telephone line can process an inbound call.

2. The call screening system of claim 1, wherein each of said filter list, said mapping and said automatic call answering processor are contained within a telephone transceiving device.

3. The call screening system of claim 2, wherein said telephone transceiving device is one of a cellular telephone, a portable telephone, a wireline telephone, and a pervasive computing device.

4. The call screening system of claim 1, wherein each of said filter list, said mapping and said call answering processor are contained within a centralized call processing switch.

5. A call screening method comprising the steps of:
   receiving an inbound telephone call destined for a called party;
   identifying from said inbound telephone call, associated caller identification data;
   comparing said associated caller identification data to a filter list of caller identification data;
   based upon said comparison, applying call management rules to said inbound call to manage said inbound call by automatically answering said inbound call without requiring pro-active intervention by said called party;
   monitoring said called party to determine when said called party can accept an inbound phone call; and,
   when it is determined in said monitoring step that said called party can accept an inbound phone call, automatically playing back a deferred voice mail to said called without requiring pro-active intervention by said called party to initiate said playing back step.

6. The method of claim 5, wherein said applying step comprises the step of where it is determined not to defer said inbound call to voice mail, determining from said filter list whether to automatically answer said inbound call, or whether to permit said called party to determine whether to answer said inbound call, or whether to allow said inbound call to route to said voice mail.

7. The method of claim 5, wherein said applying step further comprises the steps of:
   audibly prompting said called party to determine whether to accept or to defer said inbound call; and,
   where said called party indicates that said inbound call should be deferred, routing said inbound call to voice mail.

8. The method of claim 5, wherein each of said receiving, identifying, comparing and applying steps is performed in a telephone tranceiving device.

9. A machine readable storage having stored thereon a computer program for performing call screening, the computer program comprising a routine set of instructions which when executed by the machine can cause machine to perform the steps of:
   receiving an inbound telephone call destined for a called party;
   identifying from said inbound telephone call, associated caller identification data;
   comparing said associated caller identification data to a filter list of caller identification data;
   based upon said comparison, applying call management rules to said inbound call to manage said inbound call by automatically answering said inbound call without requiring pro-active intervention by said called party;

monitoring said called party to determine when said called party can accept an inbound phone call; and, when it is determined in said monitoring step that said called party can accept an inbound phone call, automatically playing back a deferred voice mail to said called party without requiring pro-active intervention by said called party to initiate said playing back step.

10. The machine readable storage of claim 9, wherein said applying step comprises the step of where it is determined not to defer said inbound call to voice mail, determining from said filter list whether to automatically answer said inbound call, or whether to permit said called party to determine whether to answer said inbound call, or whether to allow said inbound call to route to said voice mail.

11. The machine readable storage of claim 9, wherein said applying step further comprises the steps of:

audibly prompting said called party to determine whether to accept or to defer said inbound call; and, where said called party indicates that said inbound call should be deferred, routing said inbound call to voice mail.

12. The machine readable storage of claim 9, wherein each of said receiving, identifying, comparing and applying steps is performed in a telephone tranceiving device.

* * * * *